United States Patent [19]
Toyomasu

[11] 3,765,511
[45] Oct. 16, 1973

[54] DISC BRAKE DEVICE FOR BICYCLES
[75] Inventor: Takeshi Toyomasu, Ageo, Japan
[73] Assignee: Bridgestone Cycle Industry Co., Ltd., Tokyo, Japan
[22] Filed: June 12, 1972
[21] Appl. No.: 261,582

[30] Foreign Application Priority Data
June 17, 1971 Japan.............................. 46/42989
Oct. 18, 1971 Japan.............................. 46/95355
Oct. 18, 1971 Japan.............................. 46/95356

[52] U.S. Cl. ................................ 188/26, 188/72.7
[51] Int. Cl. ............................................. B62l 3/02
[58] Field of Search....................... 188/24, 26, 72.7, 188/73.3

[56] References Cited
UNITED STATES PATENTS
2,612,968  10/1952  Hood .................................... 188/26
3,292,739  12/1966  Ulbing .......................... 188/72.7 X
3,373,845  3/1968  Campagnolo ......................... 188/26
3,616,877  11/1971  Collins ............................. 188/73.3
3,675,741  7/1972  Frei et al. ............................ 188/26

Primary Examiner—Duane A. Reger
Attorney—I. Irving Silverman et al.

[57] ABSTRACT

This disc brake device for bicycles has steel balls inserted into cavities formed equidistant in one of two brake body portions held together by bolts to form a brake body and made in contact with one of two friction pads arranged at each side of a brake disc, and a rotatable cam made in contact with the steel balls and having projecting surfaces each formed between those surface portions of the cam which are normally in contact with the steel balls. An inner wire connected to a bicycle brake lever is connected at its free end to the cam for rotating the cam and urging the steel balls against one of the friction pads by the projecting surfaces of the cam when the brake lever is operated to pull the inner wire.

2 Claims, 41 Drawing Figures

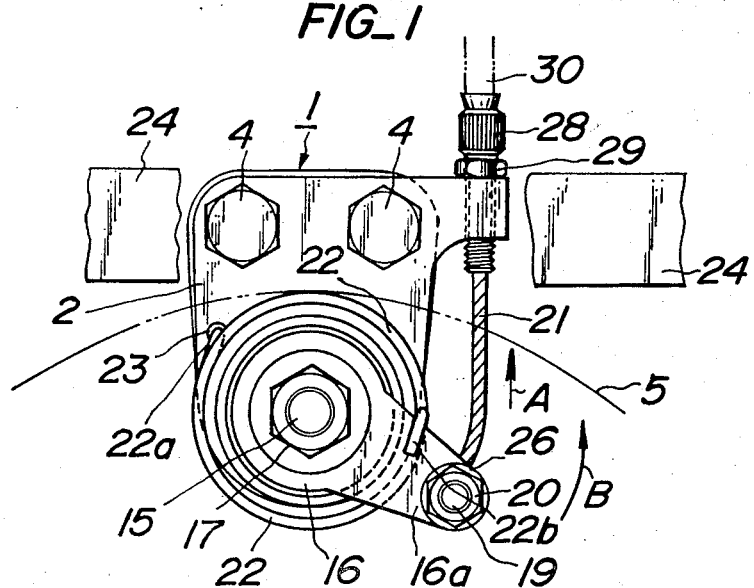
FIG_1
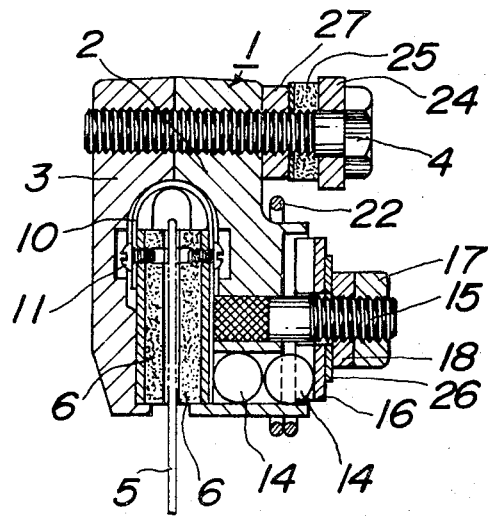
FIG_2

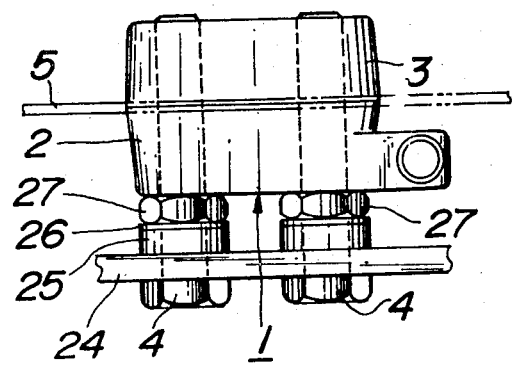
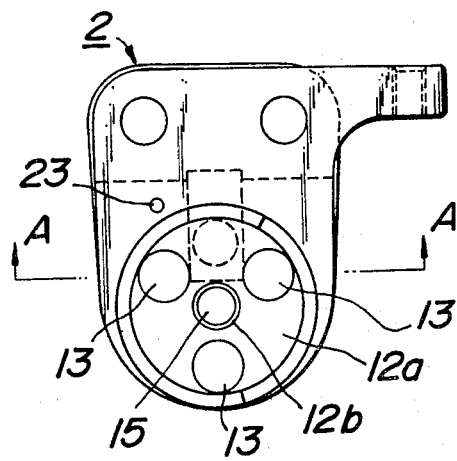
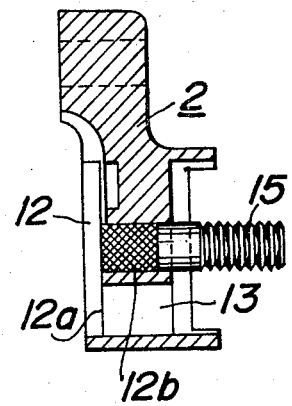

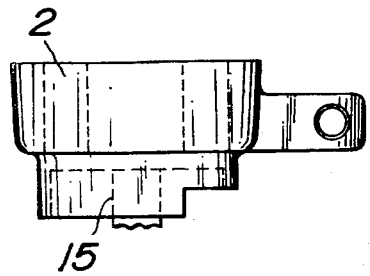
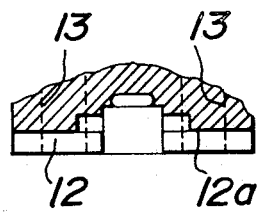
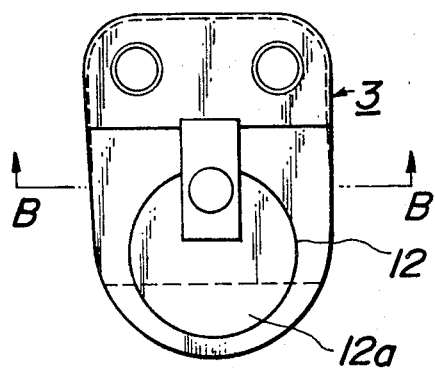
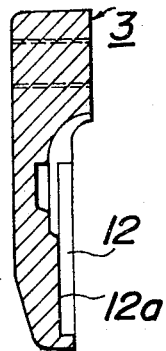
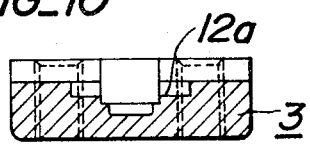

FIG_11
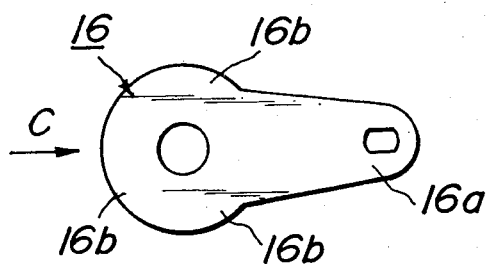
FIG_13
FIG_12
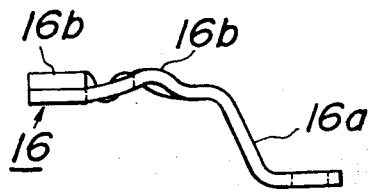
FIG_14  FIG_15
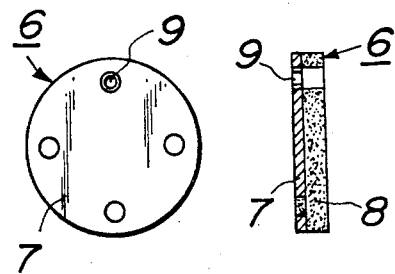

FIG_16
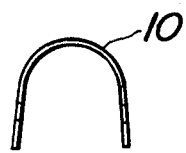
FIG_17
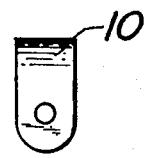
FIG_18
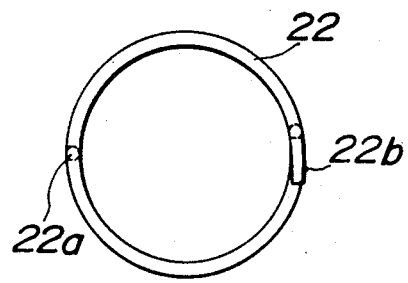
FIG_19
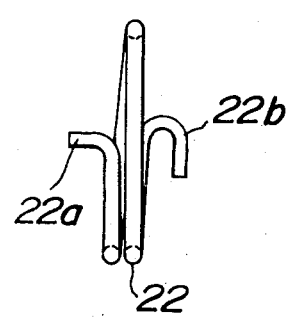

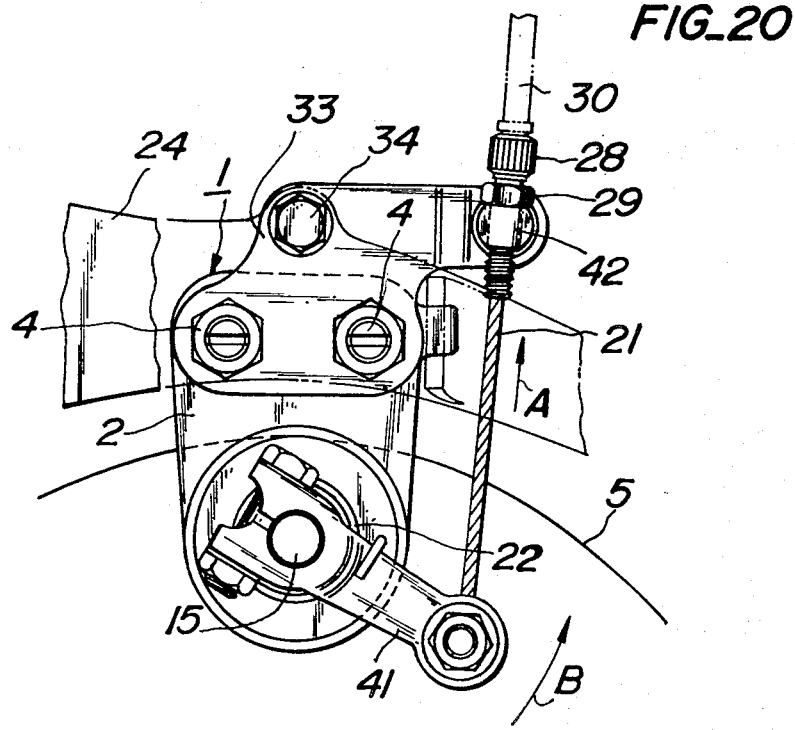
FIG_20
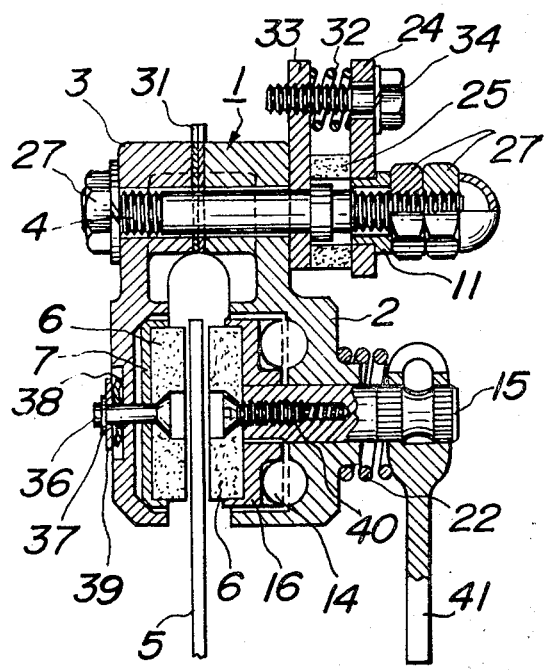
FIG_21

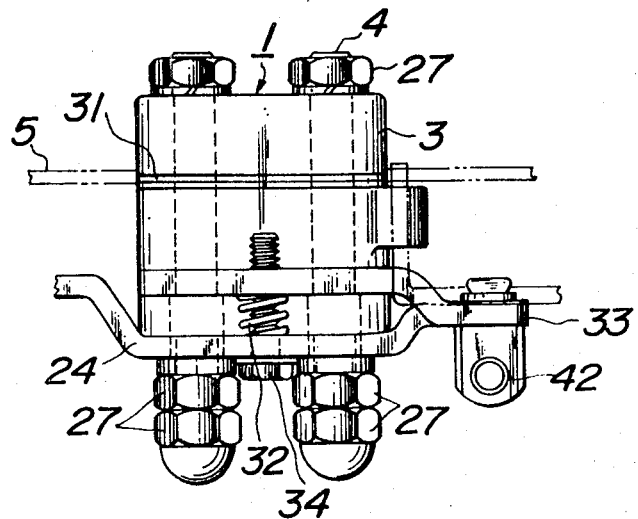
FIG_22
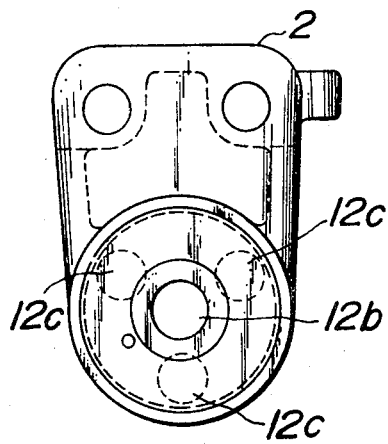
FIG_23
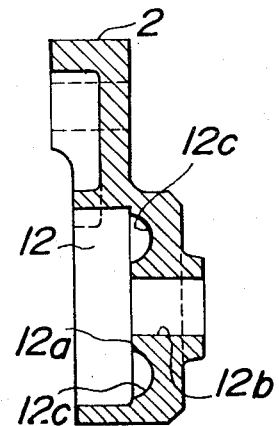
FIG_24

FIG_25
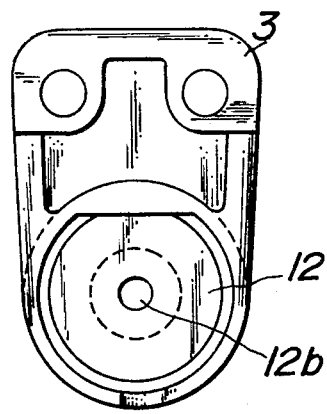
FIG_26
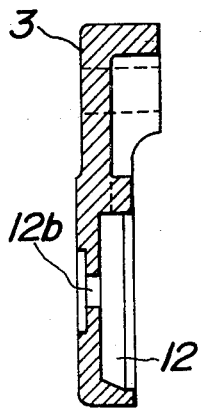
FIG_27
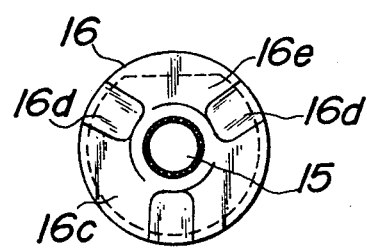
FIG_28
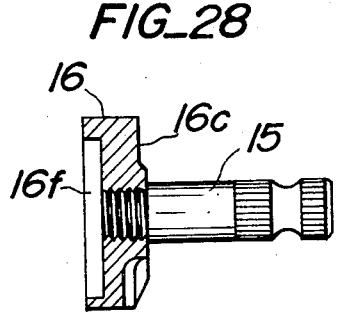
FIG_29
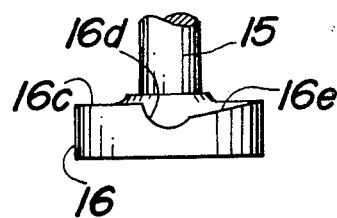
FIG_30
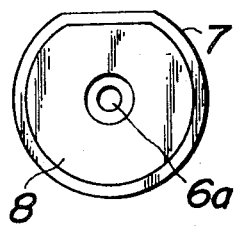
FIG_31
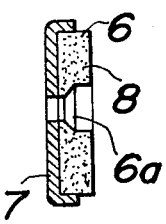

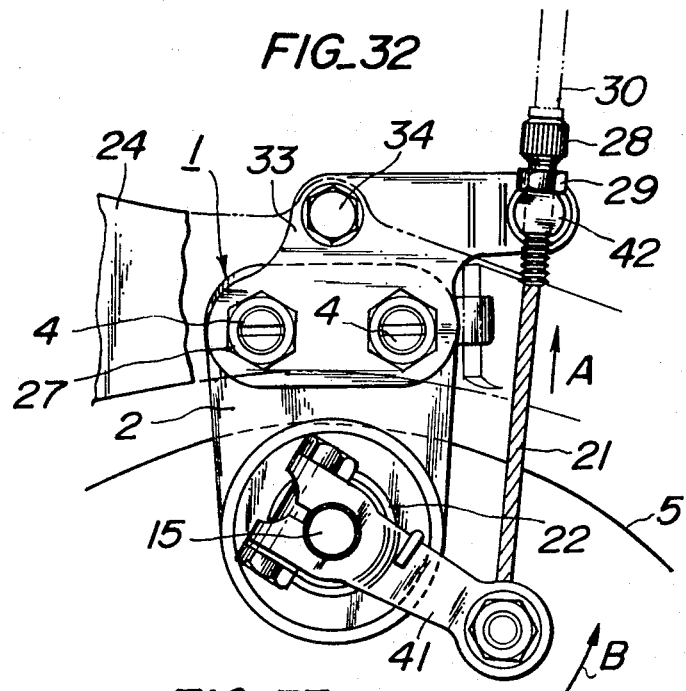
FIG_32
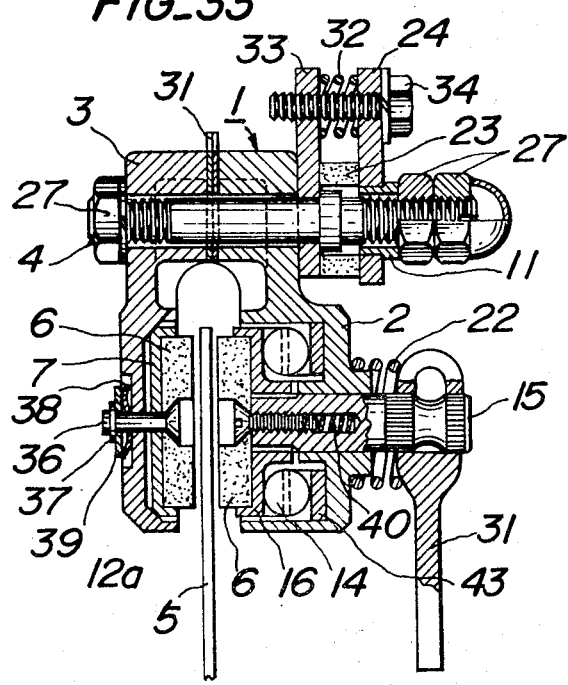
FIG_33

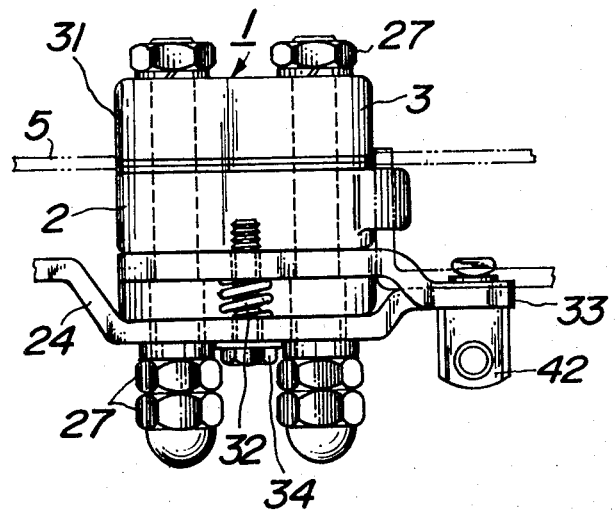
FIG_34
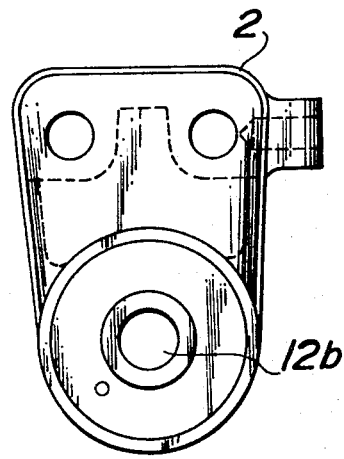
FIG_35
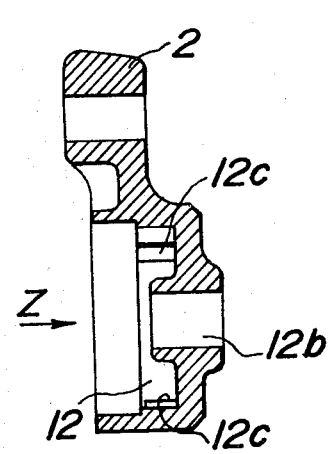
FIG_36

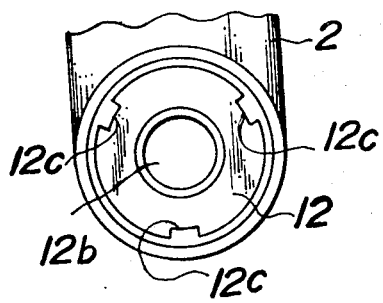
FIG_37
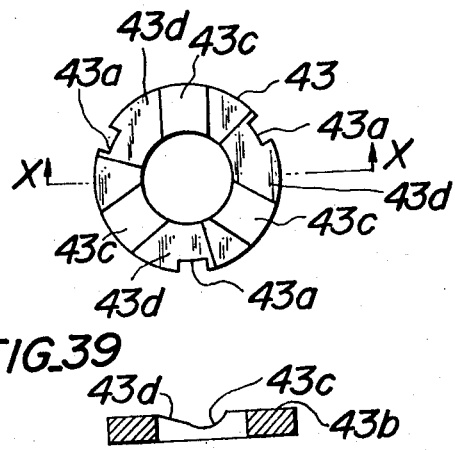
FIG_38
FIG_39
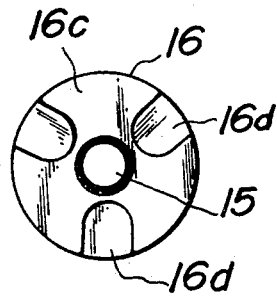
FIG_40
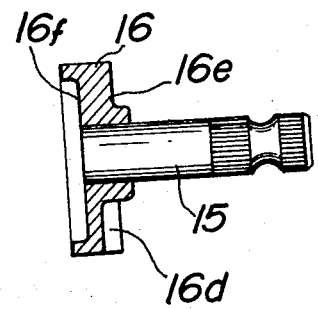
FIG_41

DISC BRAKE DEVICE FOR BICYCLES

This invention relates to a disc brake device for vehicles and more particularly for bicycles.

In conventional disc brake devices of this type, use has been made of four arms each connected at its ends to adjacent arms by pins to form a rhombus-shaped link and of two friction pads each connected through a pivotally mounted lever to the pin joint positioned at each end of one of two diagonals of the link. When it is desired to apply brakes, an inner wire connected to one of the pin joints positioned on the other diagonal is pulled to close together these pin joints whereby the other pin joints are separated one from the other, and as a result, a brake disc is held under pressure between the two friction pads by means of the pivotally mounted levers to arrest the rotating motion of the brake disc. But, such conventional disc brake device has the disadvantage that it is complex in construction and that the braking force applied to the brake disc is not sufficient enough to reliably arrest its rotating motion.

An object of the invention is to obviate the above troubles and to provide an improved disc brake device for bicycles which is reliable in operation and which may apply a significantly strong and uniform brake force to a brake disc.

Another object of the invention is to provide an improved disc brake device for bicycles which utilizes a minimum of components parts, and which may be constructed on an economical basis.

The invention will be explained in further detail with reference to the accompanying drawings, in which:

FIG. 1 shows a front elevation of a first embodiment of a disc brake device according to the invention;
FIG. 2 is its longitudinal sectional view;
FIG. 3 is a plan view of FIG. 1;
FIG. 4 shows a front elevation of a right side brake body portion;
FIG. 5 is a longitudinal sectional view of FIG. 4;
FIG. 6 is its plan view;
FIG. 7 is a section along line A—A in FIG. 4;
FIG. 8 shows a front elevation of a left side brake body portion;
FIG. 9 is a longitudinal sectional view of FIG. 8;
FIG. 10 is a section along line B—B in FIG. 8;
FIG. 11 is a plan view of a rotary cam;
FIG. 12 is its side elevation;
FIG. 13 is an end view viewed in a direction shown by an arrow C in FIG. 11;
FIG. 14 is a front elevation of a friction pad;
FIG. 15 is a longitudinal sectional view of FIG. 14;
FIG. 16 is a front elevation of a plate spring;
FIG. 17 is its side elevation;
FIG. 18 is a front elevation of a return spring;
FIG. 19 is a side elevation of FIG. 18;
FIG. 20 shows a front elevation of a second embodiment of the disc brake device according to the invention;
FIG. 21 is its longitudinal sectional view;
FIG. 22 is a plan view of FIG. 20;
FIG. 23 shows a front elevation of a right side brake body portion;
FIG. 24 is a longitudinal sectional view of FIG. 23;
FIG. 25 shows a front elevation of a left side brake body portion;
FIG. 26 is a longitudinal sectional view of FIG. 25;
FIG. 27 is a front elevation of a rotary cam;
FIG. 28 is its side elevation, in which a part is shown in a sectional view;
FIG. 29 is an end view viewed in a direction shown by an arrow X in FIG. 27;
FIG. 30 is a front elevation of a friction pad;
FIG. 31 is a longitudinal sectional view of FIG. 30;
FIG. 32 shows a front elevation of a third embodiment of the disc brake device according to the invention;
FIG. 33 is its longitudinal sectional view;
FIG. 34 is a plan view of FIG. 32;
FIG. 35 shows a front elevation of a right side brake body portion;
FIG. 36 is a longitudinal sectional view of FIG. 35;
FIG. 37 is a partial view viewed in a direction shown by an arrow in FIG. 36;
FIG. 38 shows a front elevation of a cam plate;
FIG. 39 is a section along line X—X in FIG. 38;
FIG. 40 shows a front elevation of a rotary cam; and
FIG. 41 is its side elevation, in which a part is shown in a sectional view.

In FIGS. 1 – 3 is shown a brake body 1 consisting of two brake body portions 2 and 3, the right side brake body portion 2 being shown in detail in FIGS. 4 – 7, while the left side brake body portion 3 being shown in detail in FIGS. 8 – 10. The brake body portions 2 and 3 are held together by bolts 4 passing through bores in these brake body portions.

At each side of a brake disc 5 secured to a bicycle wheel (not shown) and rotatable therewith are arranged two friction pads 6, 6 each of which consists of a metal plate 7 and a brake shoe 8 secured thereto and is provided at its periphery with a tapped hole 9 as shown in FIGS. 14 and 15. The friction pads 6, 6 are secured to each end of an inverted U-shaped plate spring 10 shown in FIGS. 16 and 17 by screws 11, 11, respectively.

The brake body portions 2 and 3 are provided at their opposed sides with circular depressed portions 12, 12 adapted to receive therein the friction pads 6, 6, respectively. The outwards expanding force of the plate spring 10 serves to always urge the friction pads 6, 6 received in the depressed portions 12, 12 against their inner wall surfaces 12a, 12a, respectively, thereby forming a suitable gap between the brake disc 5 on the one hand and the friction pads 6, 6 on the other hand.

The right side brake body portion 2 is provided in its circular depressed portion 12 with a plurality of equidistant cavities 13 extending therethrough and adapted to slidably receive steel balls 14 therein, respectively. The brake body portion 2 is provided at the center of the depressed portion 12 with a center hole 12b into which is inserted a shaft 15 having a knurled end which is secured to the inner wall of the center hole 12b.

A cam 16 shown in FIGS. 11 – 13 is rotatably mounted on the shaft 15. Nuts 16, 18 prevent the cam 16 from being moved in the axial direction of the shaft 15. The cam 16 is provided at its free end with a lever portion 16a to which is connected one end of an inner wire 21 by means of a set screw 19 and a lock nut 20.

Provision is made of a return spring 22 shown in FIGS. 18 and 19 whose one end 22a is inserted into a hole 23 of the brake body portion 2 and another end 22b is brought into engagement with the lever portion 16a of the cam 16 (FIG. 1) whereby the return spring 22 is capable of returning the cam 16 to its normal position when the inner wire 21 is released after the cam 16 has been rotated in a direction shown by an arrow B in FIG. 1 by pulling the inner wire 21 in a direction shown by an arrow A at the time of applying the brakes to the brake disc 5. The cam 16 is provided intermediate between those surface portions which normally make contact with the steel balls 14 with equidistant projecting surfaces 16b which are capable of pushing the steel balls 14 in the cavities 13 inwards against the spring action of the plate spring 10 by the rotating movement of the cam 16.

The brake body 1 is secured through a resilient shock absorbing body 25, for example, rubber, etc. to a metal fitting 24 made integral with a bicycle body (not shown) by the bolts 4, and as a result, the brake body 1 becomes movable over a short distance in the axial direction of the bolts 4 when the resilient body 25 is deformed under the action of applied forces, but could not be moved in a direction perpendicular to the axial direction of the bolts 4. In FIGS. 1 – 3, reference numeral 26 designates a washer, 27 a nut, 28 an adjusting screw for a cable 30, and 29 an adjusting nut for the cable 30.

The disc brake device as described above will operate as follows. If it is desired to apply the brakes to arrest the motion of a bicycle wheel, a brake lever (not shown) is operated to pull the inner wire 21 in the direction shown by the arrow A and hence rotate the cam 16 in the direction shown by the arrow B in FIG. 1. Then, the projecting surfaces 16b of the cam 16 are brought into contact with the steel balls 14 to hold the steel balls 14 pushed against the metal plate 7 of the friction pad 6.

Before applying the brakes to arrest the motion of the brake disc 5, a suitable gap is kept between the friction pads 6, 6 on the one hand and the brake disc 5 on the other hand. As soon as the friction pad 6 is urged against the brake disc 5 under the pushing action of the steel balls 14, the reaction of the brake disc 5 is applied through the friction pad 6, steel balls 14, cam 16 and shaft 15 to the brake body portion 2 whereby the brake body 1 as a whole is moved against the action of the resilient body 25 in the axial direction of the bolts 4, thereby urging the other friction pad 6 against the brake disc 5, and as a result, the brake disc 5 is held between the two friction pads 6, 6 under pressure.

Thus, the brakes are applied to the brake disc 5 in the form of friction between the brake disc 5 and the friction pads 6, 6 to arrest the rotation thereof. Since the brake body 1 is secured through the shock absorbing resilient body 25 such as rubber, etc. to the metal fittings 24 made integral with the bicycle body, the brake body 1 can move over a short distance after the contour of the surface of the brake disc 5. The brake body 1, however, could not move in the rotating direction of the brake disc 5.

If the brake lever (not shown) and hence the inner wire 21 is released, the cam 16 is returned to its normal position by the restoring force of the return spring 22, and as a result, the steel balls 14 become in contact with the flat surfaces of the cam 16 and the pushing force of the steel balls 14 becomes decreased and the friction pads 6 are separated from the brake disc 5 by the expanding force of the plate spring 10. Thus, the brake body 1 is moved to its normal position by the spring action of the shock absorbing resilient body 25, thereby maintaining again the suitable gap between the brake disc 5 and the friction pads 6, 6. Thus, the brake disc 5 together with the bicycle wheel become freely rotatable.

In the present embodiment, a combination of the steel balls 14 and the cam 16 makes it possible to hold the brake disc 5 between the two friction pads 6, 6 under pressure, and as a result, the braking force applied to the brake disc 5 becomes significantly strong and uniform irrespective of dried or wetted condition of the friction pads 6, 6. Moreover, the two friction pads 6, 6 are interconnected each other with the aid of the inverted U-shaped plate spring 10 so that a suitable gap can always be kept between the brake disc 5 on the one hand and the friction pads 6, 6 on the other hand. Furthermore, since the brake body 1 is secured through the shock absorbing resilient body 26 to the metal fittings 24 of the bicycle body, the position of the brake disc 5 relative to the brake pads 6, 6 becomes automatically adjusted, and as a result, the braking force applied to both the friction pads 6, 6 becomes uniform.

In the second embodiment shown in FIGS. 20 – 22, the brake body portions 2 and 3 are held together with a shim 31 sandwiched therebetween by the bolts 4 passing through the bores in these brake body portions and by the nuts 27.

The brake body 1 is secured through the resilient shock absorbing body 25, for example, rubber, etc. and a spring 32 to the metal fitting 24 made integral with the bicycle body. The resileint body 25 is inserted between a bracket 33 secured to the brake body portion 2 and the metal fittings 24, while the spring 32 is wound around an adjusting bolt 34 passing through bores in the metal fitting 24 and the bracket 33.

In the present embodiment, the left side brake body portion 3 is provided at its circular depressed portion 12 with a center hole 12b and the friction pad 6 having a center hole 6a is secured to the brake body portion 3 by means of a flush head rivet 36 passing through the center hole 6a of the friction pad 6 and the center hole 12b of the brake body portion 3 and by means of a stop ring 37 secured through a corrugated washer 38 and flat washer 39 to the free end of the flush head rivet 36.

Around the center hole 12b of the right side brake body portion 2 are arranged a pluraltiy of equidistant semi-circular cavities 12c (in the embodiment shown three cavities 12c). Received in these semi-circular cavities 12c are the steel balls 14 whose semi-circular portions projected out of the cavities 12c are brought into contact with the rotary cam 16. In the present embodiment, the rotary cam 16 is provided at its rear surface 16c with equidistant semi-circular cavities 16d arranged in opposition to the cavities 12c of the brake body portion 2 to form spherical cavities when the cam 16 is fitted into the depressed portion 12 of the brake body portion 2. These semi-circular cavities 16d are connected through inclined surfaces 16e to the rear flat surface 16c, respectively, as shown in FIGS. 27 – 29. The rotary cam 16 is provided at its front surface with a circular depressed portion 16f into which is secured the friction pad 6 by a screw 40.

As seen from the above, the rotary cam 16 is made as a disc to which center is secured the shaft 15 passing through the center hole 12b of the right side brake body portion 2.

To the free end of the shaft 15 is secured an arm 41 and the return spring 22 is inserted between the arm 41 and the right side brake body portion 2, one end of the return spring 22 being engaged with the projected end of the cam shaft 15 while another end being engaged with the brake body portion 2. The free end of the inner wire 21 of the cable 30 is connected to the free end of the arm 41. In FIG. 20 reference numeral 42 designates an adjustable nut for the cable 30.

The operation of the present disc brake device as described above is substantially the same as that of the first embodiment described with reference to FIGS. 1 – 3. In the present embodiment, however, when the brake lever (not shown) is operated to pull the inner wire 21 in the direction shown by the arrow A and hence rotate the arm 41 in the direction shown by the arrow B, the rotary cam 16 is caused to be rotated through the shaft 15 against the action of the return spring 22. Thus, the semi-circular cavities 16d, inclined surfaces 16e and the rear flat surface 16c of the rotary cam 16 are brought into contact with the steel balls 14 received in the semi-circular cavities 12c of the right side brake body portion 2 in succession, and as a result, the rotary cam 16 together with its shaft 15 are caused to be moved towards the left against the action of the return spring 22, thereby urging the friction pad 6 against the brake disc 5. The reaction of the brake disc 5 causes the another friction pad 6 to urge against the brake disc 5 to arrest the rotation thereof.

If the brake lever (not shown) and hence the inner wire 21 is released, the arm 41 is returned to its normal position by the restoring force of the return spring 22, and as a result, the semi-circular cavities 16d of the rotary cam 16 are again brought into engagement with the steel balls 14. Thus, the friction pads 6, 6 together with the shaft 15 are moved to their normal positions shown in FIG. 21 by the spring action of the return spring 22, thereby making the brake disc 5 freely rotatable.

In the present embodiment, the use of the return spring 22 having one end engaged with the projected portion of the cam shaft 15 and another end engaged with the brake body portion 2 renders it possible to reliably return the friction pads 6, 6 to their normal positions.

Moreover, the change of the gap between the brake disc 1 and the friction pads 6, 6 owing to the wear of the brake shoes after a long use may be compensated by adjusting the thickness of the shim 31, with the result that any suitable gap between the brake disc 5 and the friction pads 6, 6 may always be maintained.

In the third embodiment of the disc brake device for bicycles according to the invention shown in FIGS. 32 – 34, the right side brake body portion 2 is provided at the periphery of its circular depressed portion 12 with a plurality of equidistant projections 12c (in the emboidment shown three projections 12c) as shown in FIGS. 36 and 37. Provision is made of a cam plate 43 having at its periphery a plurality of equidistant slots 43a (in the emboidment shown three slots 43a) adapted to be engaged with the projections 12c, respectively. The cam plate 43 is provided on its front surface 43b with three equidistant semi-circular cavities 43c which are connected through inclined surfaces 43d to the front flat surface 43b, respectively, and adapted to receive the steel balls 14 therein.

In the present embodiment, the rotary cam 16 is provided at its rear surface 16c arranged in opposition to the cavities 43c of the cam plate 43 with corresponding equidistant semi-circular cavities 16d which together with the semi-circular cavities 43c of the cam plate 43 form spherical cavities as shown in FIGS. 40 and 41.

The operation of the present disc brake device as described above is substantially the same as those of the first and second embodiments described with reference to FIGS. 1 – 3 and FIGS. 20 – 22, respectively.

In the present embodiment, however, when the brake lever (not shown) is operated to pull the inner wire 21 in the direction shown by the arrow A and hence rotate the arm 41 and shaft 15 in the direction shown by the arrow B, the rotary cam 16 and the steel balls 14 received in the cavities 16d of the cam 16 are caused to be rotated through the shaft 15. Thus, the steel balls 14 in the semi-circular cavities 16d of the rotary cam 16 are brought into engagement with the inclined surfaces 43d and then with the front flat surfaces 43b of the cam plate 43, and as a result, the rotary cam 16 together with its shaft 15 are caused to be moved towards the left against the action of the return spring 22, thereby urging the friction pad 6 against the brake disc 5. The reaction of the brake disc 5 causes the another friction pads to urge against the brake disc 5 to arrest the rotation thereof.

If the brake lever is released, the arm 41 and the shaft 15 are returned to their normal positions by the restoring force of the return spring 22, and as a result, the steel balls 14 received in the semi-circular cavities 16d of the cam 16 are again brought into engagement with the semi-circular cavities 43c of the cam plate 43. Thus, the friction pads 6, 6 together with the shaft 15 are moved to their normal positions shown in FIG. 33 by the spring action of the return spring 22, thereby making the brake disc 5 freely rotatable.

In the present embodiment, the cam plate 43 is separated from the rotary cam 16 and detachably secured to the brake body portion 2 so that the cam plate 43 can be produced by machining in a simple and easy manner. If the cam plate 43 becomes weared after a long use it can be replaced by a new one in an easy and rapid manner.

As stated hereinbefore, the disc brake device according to the invention has a number of advantages. In the first place, a combination of the steel balls 14 and the cam 16 makes it possible to hold the brake disc 5 between the two friction pads 6, 6 under pressure, and as a result, the braking force applied to the brake disc 5 becomes significantly strong and uniform irrespective of dried or wetted condition of the friction pads 6, 6. Secondly, the two friction pads 6, 6 are interconnected each other with the aid of the inverted U-shaped plate spring 10 so that a suitable gap can always be kept between the brake disc 5 on the one hand and the friction pads 6, 6 on the other hand. Third, since the brake body 1 is secured through the shock absorbing resilient body 25 to the metal fittings 24 of the bicycle body, the position of the brake disc 5 relative to the friction pads 6, 6 becomes automatically adjusted, and as a result, the braking force applied to both the friction pads 6, 6 becomes uniform. Fourth, even when the friction pads 6, 6 become worn, the change of the position of the cam 16 always permits a suitable gap between the brake disc 5 and the friction pads 6, 6 to be maintained. Fifth, the use of the return spring 22 having one end engaged with the projected portion of the cam shaft 15 and another end engaged with the brake body portion 2 renders it possible to reliably return the friction pads 6, 6 to their normal positions. Sixth, the brake body 1 is divided into two brake body portions 2 and 3 which are held together with the shim 31 sandwiched therebetween, and as a result, even when the friction pads 6, 6 become worn the adjustment of the thickness of the shim 31 always permits a suitable gap between the brake disc 5 and the friction pads 6, 6 to be maintained. Finally, since the cam plate 43 is separated from the rotary cam 16 and detachably secured to the brake body portion 2, the cam plate 43 can easily be machined and can easily and rapidly be replaced by a new one when the cam plate 43 becomes worn after a long use.

It may be clear that the invention is not restricted to the embodiments described and that many variations are possible for those skilled in the art without leaving the scope of the invention.

I claim:

1. A disc brake device for bicycles comprising a brake disc secured to a bicycle wheel and rotatable therewith, a brake body consisting of two brake body portions held together by bolts passing through bores in said brake body portions and secured to a bicycle body, a shock absorbing resilient body inserted between said brake body and said bicycle body, each of said brake body portions being provided at its surface opposite to said brake disc with a circular depressed portion, friction pads arranged at each side of said brake disc and received in said depressed portions of said brake body portions, respectively, steel balls inserted into cavities formed equidistant in one of said brake body portions and made in contact with one of said friction pads, and a rotatable cam made in contact with said steel balls and having projecting surfaces each formed between those surface portions of said cam which are normally in contact with said steel balls, said cam being connected through an inner wire to a brake lever of a bicycle, one of said friction pads being secured to said depressed portion of one of said brake body portions and said rotatable cam including a cam shaft passing through a center hole of said depressed portion of another brake body portion and having at its one end another friction pad secured thereto and at its free end an arm connected to one end of said inner wire, and a return spring having one end engaged with the projected portion of said cam shaft and another end engaged with one of said brake body portions.

2. A disc brake device for bicycles as claimed in claim 1 wherein said rotatable cam includes a cam plate separated from said cam and detachably secured to said depressed portion of another brake body portion, said cam plate being made in contact with said steel balls and having said projecting surfaces.

* * * * *